(12) United States Patent
Volpe et al.

(10) Patent No.: US 10,911,579 B1
(45) Date of Patent: Feb. 2, 2021

(54) GENERATING PROGRAMMATICALLY DEFINED FIELDS OF METADATA FOR NETWORK PACKETS

(71) Applicant: Amazon Technologies, Inc., Seattle, WA (US)

(72) Inventors: Thomas A. Volpe, Austin, TX (US); Timothy David Gasser, Austin, TX (US); Robert Michael Johnson, Austin, TX (US); Mark Bradley Davis, Austin, TX (US); Vithal Dattatraya Shirodkar, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 348 days.

(21) Appl. No.: 15/058,074

(22) Filed: Mar. 1, 2016

(51) Int. Cl.
*H04L 29/06* (2006.01)
*H04L 12/743* (2013.01)

(52) U.S. Cl.
CPC .......... *H04L 69/22* (2013.01); *H04L 45/7453* (2013.01)

(58) Field of Classification Search
None
See application file for complete search history.

(56) References Cited

U.S. PATENT DOCUMENTS

| | | | | |
|---|---|---|---|---|
| 6,453,360 B1* | 9/2002 | Muller | ..................... | H04L 29/06 370/235 |
| 6,854,117 B1* | 2/2005 | Roberts | ............... | G06F 15/8053 370/392 |
| 7,760,719 B2* | 7/2010 | Yik | ..................... | H04L 49/3063 370/389 |
| 9,501,795 B1* | 11/2016 | Friedman | ............... | G06Q 40/06 |
| 2010/0254391 A1* | 10/2010 | Kramer | .................. | H04L 45/745 370/395.32 |
| 2010/0293327 A1* | 11/2010 | Lin | ..................... | H04L 45/7457 711/108 |
| 2012/0195208 A1* | 8/2012 | Abel | ...................... | H04L 69/22 370/252 |
| 2013/0163427 A1* | 6/2013 | Beliveau | ................. | H04L 69/22 370/235 |
| 2015/0156288 A1 | 6/2015 | Lu | | |
| 2016/0226826 A1* | 8/2016 | Pan | ....................... | H04L 43/026 |
| 2017/0063690 A1* | 3/2017 | Bosshart | ................. | H04L 45/72 |
| 2017/0257388 A1* | 9/2017 | Addepalli | .......... | H04L 63/1416 |

* cited by examiner

*Primary Examiner* — Jenkey Van

(74) *Attorney, Agent, or Firm* — Robert C. Kowert; Kowert, Hood, Munyon, Rankin & Goetzel, P.C.

(57) ABSTRACT

Programmatically defined fields of metadata for a network packet may be generated. Instructions indicating different portions of data from different headers of a network packet may be stored at a packet processor. When a network packet is received, the different portions of the data may be extracted from the different headers of the packet according to the instructions and provided to other stages of the packet processor for processing. Different portions of the same programmatically defined field may be utilized at different stages in the packet processor. The programmatically defined field may be used to generate a hash value that selects an entry in a lookup table describing a forwarding decision for a network packet.

17 Claims, 7 Drawing Sheets

GENERATING PROGRAMMATICALLY DEFINED FIELDS OF METADATA FOR NETWORK PACKETS

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or other limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

Figure 1:
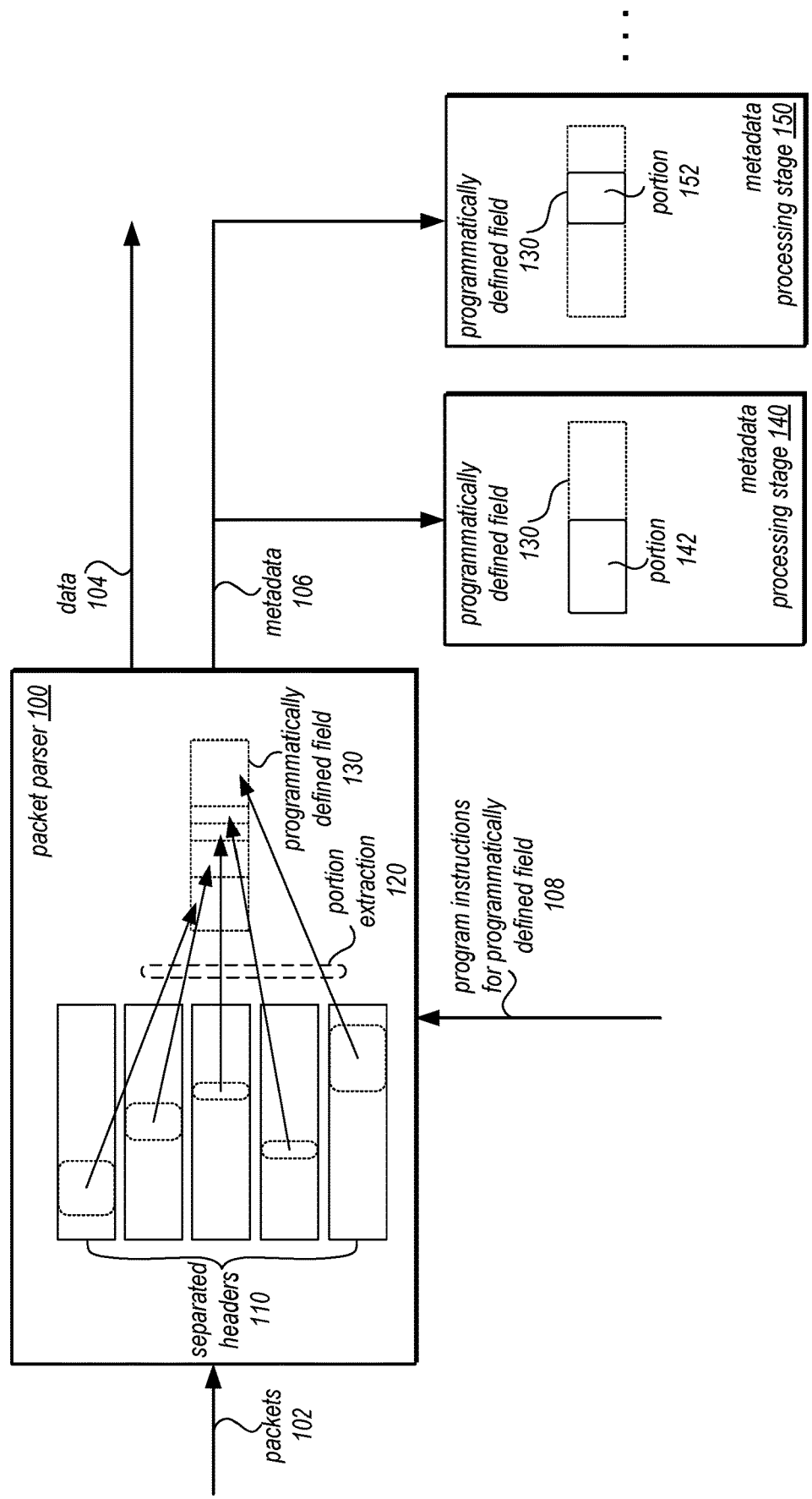
FIG. 1 illustrates a logical block diagram of generating a programmatically defined field of metadata for network packets, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement generating a programmatically defined field of metadata for a network packet. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. For example, a next hop address may be determined which identifies the next immediate destination to which the network packet may be sent. Once a forwarding decision is made, modifications to the packet may or may not be performed, and the packet sent to a next networking device connected to the current networking device (or the networking packet may be dropped). Forwarding of the network packet may continue amongst the networking devices of a network until the network packet reaches the desired destination.

Programmatically defined fields of metadata may be implemented in various embodiments to provide additional information for the purpose of making forwarding decisions for a network packet. For example, other processing stages, such as an access control list stage illustrated in FIG. 5 below, may utilize a portion or all of a programmatically defined field to determine whether an access control rule should be applied to a network packet. Programmatically defined fields may be utilized to generate hash values, such as discussed below with regard to FIG. 4, so that hash-based selection of different forwarding decisions may be performed, such as discussed below with regard to FIG. 6.

Programmatically defined fields of metadata may be any collection, aggregation, inclusion or combination of data from one or multiple different headers in a network packet which may be programmatically specified for inclusion in a programmatically defined field for the network packet. Because programmatically defined fields can be specified (e.g., by storing instructions in control registers) they can also be changed. In this way, the metadata collected for making forwarding decisions for network packets can be changed to adapt to new or different protocols or other operations that may be handled at a packet processor. In some embodiments, programmatically defined fields of metadata may be referred to as user-defined fields (UDFs).

FIG. 1 illustrates a logical block diagram of generating a programmatically defined field of metadata for network packets, according to some embodiments. Packet parser 100 may be implemented as part of a packet processor or any packet processing pipeline to parse received data of network packets 102 into data 104 (e.g., payload data) and metadata 106. Packets 102 may be many different types of network packets (e.g., layer 2 of the open systems interconnect (OSI) model, layer 3 of the OSI model, multiprotocol label switching (MPLS)). Metadata 106 may include various fields of data extracted from different packet headers. Version field, total length field, time to live or flags from an Internet Protocol version 4 (IPv4) header, for instance, may be extracted and included as part of metadata 106. Metadata 106 may also include a programmatically defined field 130 extracted according to previously programmed instructions 108.

Packet parser 100 may separate different headers 110. For instance, as discussed below with regard to FIG. 4, a header separator may be implemented to process a stream of packet data and identify where different packet headers begin and end within the stream of packet data. Once separated, data may be extracted from headers 110 in order to generate metadata 106. In the case of programmatically defined field 130, parser 100 may extract portions 120 according to stored instructions. For example, the stored instructions may identify multiple headers from which data is to be extracted, as illustrated in FIG. 1, or from a single header, identify the location of the data to be extracted within the headers, identify the length or amount of the data to be extracted, and may indicate various conditions, checks, or other operations to be performed to ensure that the identified portion of the data is valid for inclusion in programmatically defined field 130. In at least some embodiments, portions extracted 120 for programmatically defined field 130 may be a different granularity, data alignment, or size than portions of data extracted for other metadata. For instance, program instructions 108 may specify the extraction of particular bits or nibbles (e.g., 4 bits) of data for programmatically defined field 130, whereas portions of data obtained for other metadata fields may be extracted per byte.

Different processing stages may utilize different portions of programmatically defined field 130. For example, as illustrated in FIG. 1, metadata processing stage 140 may extract portion 142 in order to perform one or more operations to determine a forwarding decision, while metadata processing stage 150 may utilize a different portion of programmatically defined field 130, portion 152, to determine a forwarding decision. Such processing stages may be configured to extract or otherwise utilize portions of programmatically defined field 130 at the same granularity, data alignment or size as parser 100. If, for instance, parser 100 extracts nibbles of data, then metadata processing stages 140 and 150 may also extract nibbles of data. In this way, the same programmatically defined field can include data useful for different processing stages. In some embodiments, stages that utilize programmatically defined field 130 may extract data at different granularities than used to generate the programmatically defined field 130 (e.g., subsequent stages may extract individual bits from programmatically defined field 130 instead of a nibble of data).

Please note that the previous description of generating a programmatically defined field for network packets is not intended to be limiting but is provided as a logical example of parsing a network packet, generating metadata, and processing the metadata at subsequent stages. The organization of components, entries, and other depicted items may be different than those illustrated in FIG. 1.

This specification begins with a general description of a networking device, which may generate metadata for received network packets, including a programmatically defined field, to perform forwarding of network packets at a packet processor. Then various examples of a packet processor are discussed, including different components/modules, or arrangements of components/modules that may be implemented which generate and utilize programmatically defined fields to determine forwarding decisions for network packets. A number of different methods and techniques to implement generating a programmatically defined field for network packets are then discussed, some of which are illustrated in accompanying flowcharts. Various examples are provided throughout the specification.

Figure 2:
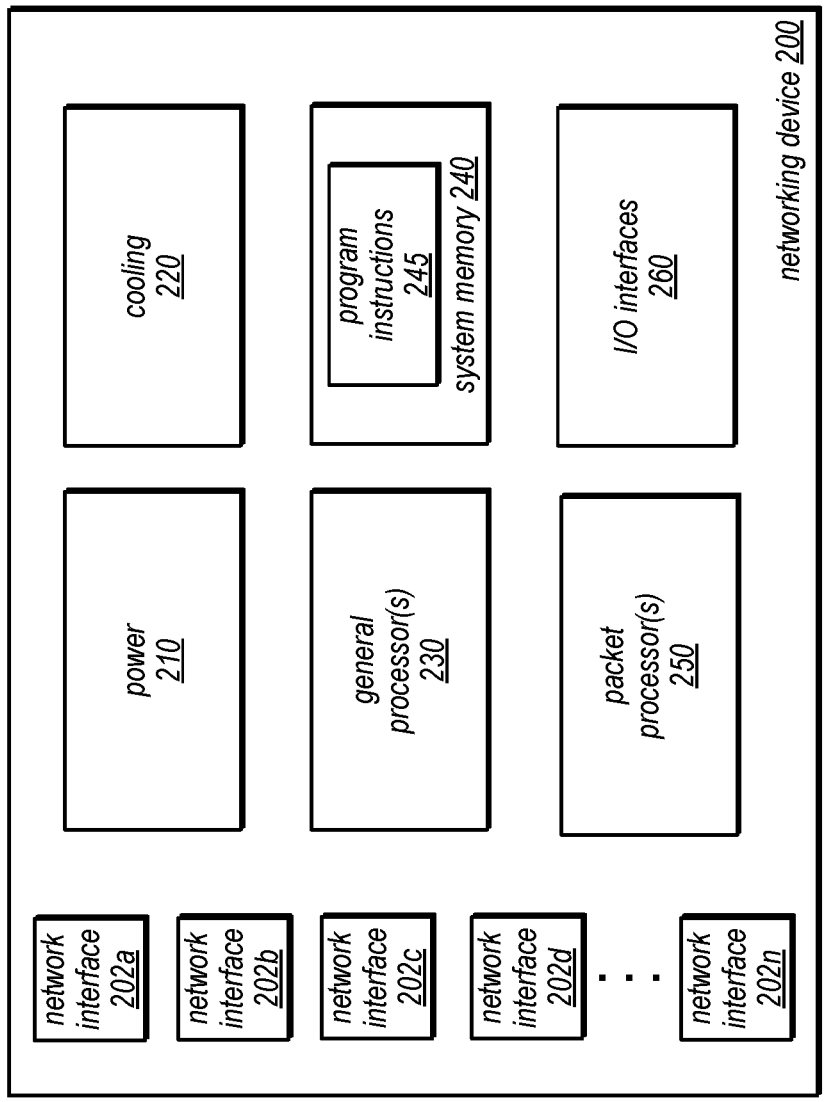
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 (or other networking models) to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.) or program control status registers or other components at packet processors 250 with instructions to generate metadata fields or hash values, such as programmatically defined fields according to the techniques discussed below with regard to FIGS. 7-8. Additionally, a controller may be able to access network packets trapped or logged by a packet processor 250 for further analysis and direct processing actions to be performed by packet processor 250 for the network packet.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
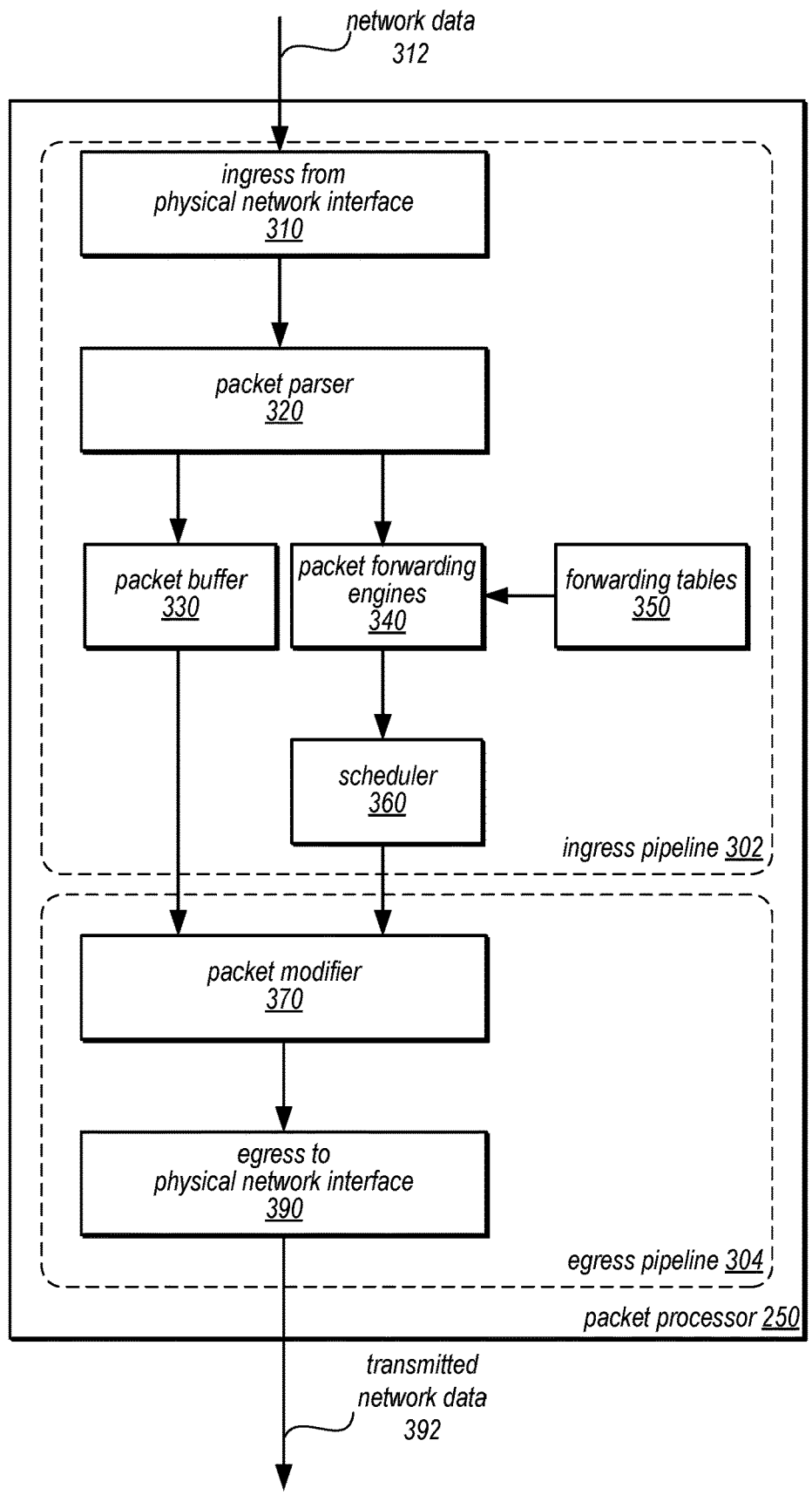
FIG. 3 is a logical block diagram illustrating a packet processor that processes network packets utilizing according to metadata generated from headers in the network packets, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that processes network packets utilizing according to metadata generated from headers in the network packets, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated resources for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data to generate metadata, including a programmatically defined field, for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers, as discussed in detail below with regard to FIG. 4. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet metadata extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port. If the MAC address is known but attached to a different port than indicated in the MAC address table, then an operation may be performed to move the source MAC address to the port. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding in some embodiments. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
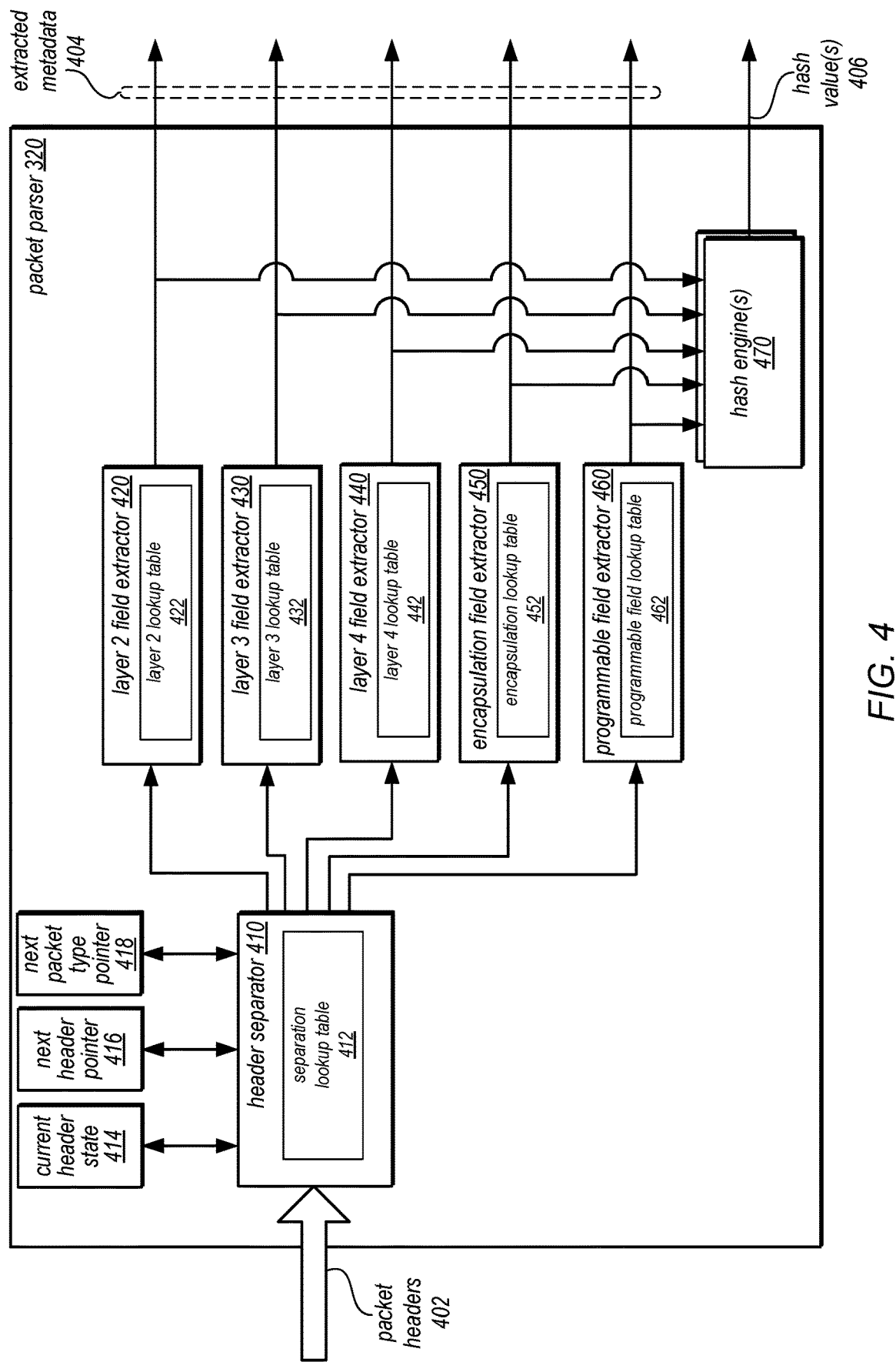
FIG. 4 is a logical block diagram illustrating a packet parser that generates programmatically defined fields of metadata for network packets, according to some embodiments.

FIG. 4 is a logical block diagram illustrating a packet parser that generates programmatically defined fields of metadata for network packets, according to some embodiments. Packet parser 320 extracts header data from a variety of packet types received at the packet processor. Different types of network packets may include different header types (e.g., Ethernet, layer 2 only, MPLS, IPv4, IPv6, layer 3 only, UDP, TCP, or generic routing encapsulation (GRE)) in various orderings. For instance, a network packet may include an Ethernet header, then an MPLS header, then a GRE header, then an IPv4 and finally a TCP header. Packet parser 320 may be programmed to identify valid or expected sequences of header types and may be re-programmed to support different packet or header types.

Packet parser 320 may process packet data in a streaming or pipelined fashion so that as a stream of packet header data 402 is received by packet processor 320 and processed by one stage of packet parser 320 (e.g., header separator 410), other stages of packet parser 320 may process other data in the packet header stream. For example, as illustrated in FIG. 4, header separator 410 may receive packet header data 402, identify the header type of the data, and provide an indication of the header type of the data, along with the header data, to field extractors 420, 430, 440, 450, and 460, so that field extractors may extract data from the stream of data where appropriate (e.g., fields from data identified as a layer 2 header at layer 2 field extractor 420). In this way, header separator 410 may continue processing new data for a different network packet, while field extractors work to extract data for metadata fields of the prior network packet. As illustrated in FIG. 4, field extractors may operate in parallel, in some embodiments, to extract data from different headers or layers of a network packet, which are identified to the field extractors by header separator 410. Layer 2 field extractor 420 may extract layer 2 metadata fields, while in parallel, layer 3 field extractor 430 extracts layer 3 metadata fields, for instance.

Header separator 410 separates and/or identifies packet headers 402 into different header types. For instance, as packet header 402 is received, header separator 410 may access separation lookup table 412 to identify the header type of packet header 402 based on state information maintained for the header separator, including the current header 414, the next header pointer 416, and next packet type pointer 418 (to detect when data for a different network packet is received). Header separator 410 may provide indications to field extractors 420, 430, 440, 450, and 460 of the different headers to which packet header 402 belongs. For example, header separator 410 may provide labels, tags, or other indicators for each byte of data that identifies which header includes the byte of data. Other information about the data may also be included in the indications provided to field extractors, such as whether the header is an inner or outer header.

Packet parser 320 may implement multiple field extractors to operate in parallel on header data 402 based on indications provided to the field extractors from header separator 410. Different field extractors may generate metadata fields specific to a particular header type or group of header types. For example, as illustrated in FIG. 4, packet parser 320 may implement layer 2 field extractor 420 to extract different portions of data from bytes of packet headers 402 identified as a layer 2 header, such as one or more fields from an Ethernet header. Layer 2 field extractor 420 may access layer 2 lookup table 422 which may indicate those portions to extract. Note that in some embodiments multiple different header types may be considered layer 2 (or extracted by layer 2 field extractor) and thus the previous example is not intended to be limiting.

Lookup table 422 may be programmed to identify those portions to extract, where (e.g., the offset) the portions to extract may be found, and any other operations to perform (e.g., masks to apply) before outputting a metadata field 404 from layer 2 field extractor 420. Similar to layer 2 field extractor, layer 3 field extractor 430, layer 4 field extractor 440, and encapsulation field extractor 450 may be able to identify header data 402 received from header separator 410 as a header from which the field extractor extracts data (e.g., based on the indications received from header separator 410) and extract portions of data identified by their respective lookup tables, layer 3 lookup table 432, layer 4 lookup table 442, and encapsulation lookup table 452. As with layer 2 field extractor 420, layer 3 field extractor 430, layer 4 field extractor 440, and encapsulation field extractor 450 may be able to extract data from multiple types of headers that correspond to the respective layer (e.g., layer 3 may include IPv4, IPv6, internet control message protocol (ICMP), etc.).

Figure 8:
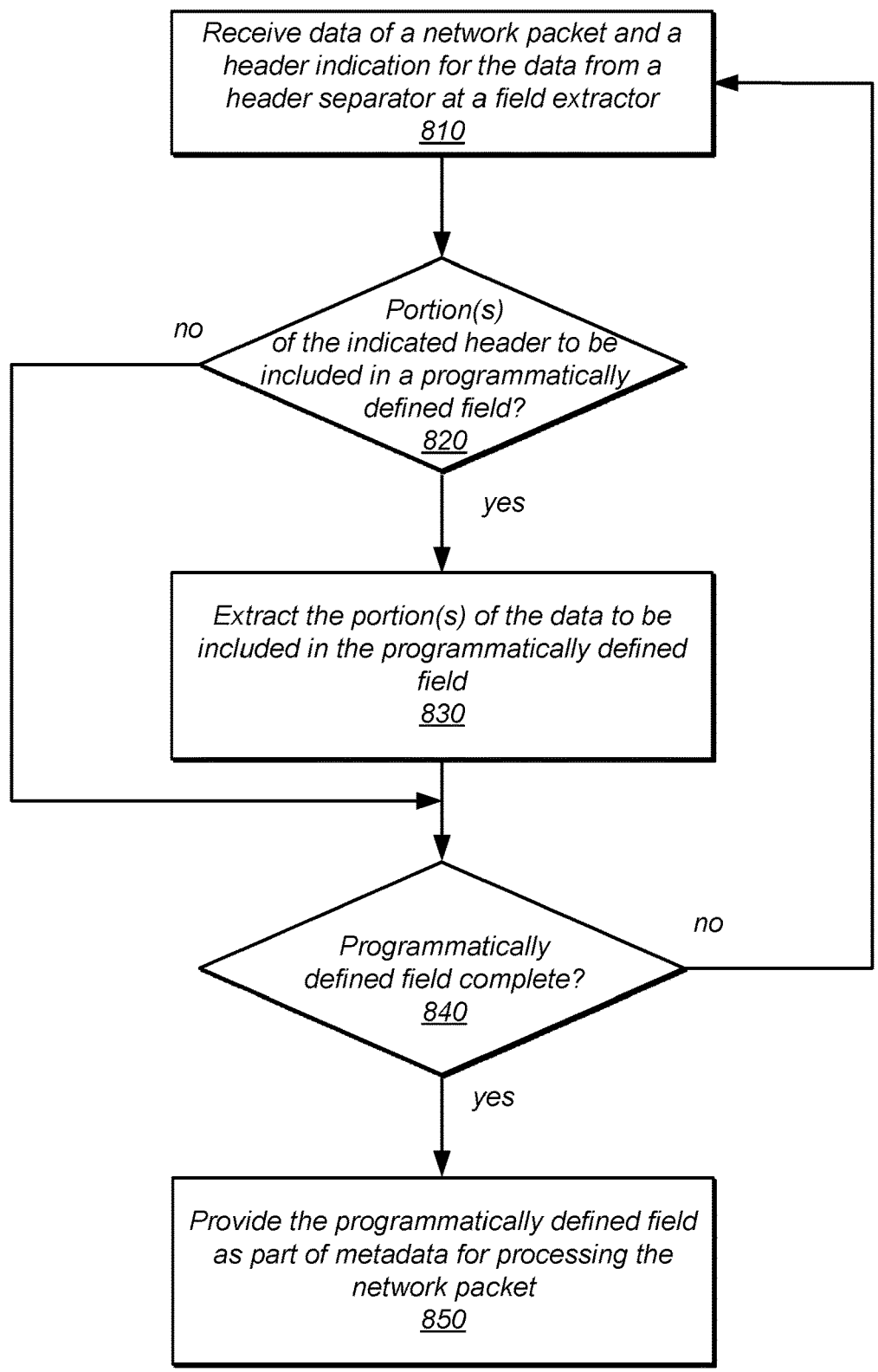
FIG. 8 is a high-level flowchart illustrating various methods and techniques to extract portions of data from headers in a network packet to include in a programmatically defined field, according to some embodiments.

Programmable field extractor 460 may be implemented as part of packet parser 320 to generate a programmatically defined field as part of extracted metadata 404 (e.g., according to the various techniques discussed below with regard to FIG. 8). Programmable field extractor 460 may be configured to extract data from any header identified by header separator 410 (unlike layer 2 field extractor 420, layer 3 field extractor 430, layer 4 field extractor 440, and encapsulation field extractor 450 which may be limited to particular headers) and include different portions of data from different the different headers in a same programmatically defined field. Programmable field lookup table 462 may be programmed to identify different portions of data within a header for extraction. In at least some embodiments, programmable field extractor 460 may extract data at a different (e.g., finer) granularity, data alignment or size than layer 2 field extractor 420, layer 3 field extractor 430, layer 4 field extractor 440, and encapsulation field extractor 450 (such as extracting particular bits or nibbles of data, instead of a particular byte). In this way, a programmatically defined field can be more efficiently utilized to store diverse information from across the headers of packet (which may be utilized together, individually, or in various combinations to perform packet processing at subsequent stage(s) in a packet processing pipeline).

Programmable field lookup table 462 (as with other lookup tables, 422, 432, 442, and 452) may be programmed by a controller, such as discussed above with regard to FIG. 2. Various instructions to describe the different portions from the headers to include in the programmatically defined field may be stored, including but not limited to instructions that identify which headers include data to be extracted, instructions that identify validations or checks to be performed, such as checks to identify if the data is from the identified header, checks to identify if the previous header type and current header type information match, and/or a check to determine the packet type matches an indicated packet type for the data, the location of the portion of data within the header, instructions that indicate the location of the portion of the data within the programmatically defined field (e.g., the particular byte in which the extracted nibble is stored) and instructions that indicate whether any further data manipulations, such as a mask, are to be applied to the extracted portion of the data. In some embodiments, the programmatically defined field may be a fixed width (e.g., 38 bits) for which corresponding instructions to fill each portion of the field may be stored. However, in some scenarios, instructions may only be provided for some portions of the programmatically defined field, and a default value may be inserted in unused portions to indicate that the portions are not to be utilized.

In at least some embodiments, packet parser 320 may implement hash engine(s) 470 to generate hash values 406 based on extracted metadata 404. Such hash values may be utilized to perform hash-based load balancing across different possible forwarding routes for a network packet at different forwarding stages, such as discussed below with regard to FIG. 6. For example, hash engines 406 may apply different hash functions (e.g., CRC16-CITT and CRC16-IBM (Bisync)) to different metadata fields, including a programmatically defined field, to generate one hash value for one processing stage, such as tunneling, and another hash value for a different processing stage, such as link aggregation grouping.

In some embodiments, hash engines 470 may generate hash values based on stored instructions for generating hash values. Similar to the stored instructions for generating a programmatically defined field discussed above, instructions for hash engines 470 may be programmed or specified by a controller accessing control registers, memory, or other components utilized by hash engine(s) 470 to configure the generation of hash values 406. Fields of metadata selected from different headers may be specified (e.g., ingress physical port, ingress logical port, pipeline identifier, port number within the pipeline, source MAC address, destination MAC address, VLAN ID, MPLS labels, source IP address, destination IP address, protocol field, source port, and/or destination port) as may be the programmatically defined field. In some embodiments, different portions of the programmatically defined field (e.g., different nibbles) may be specified for different hash values 406 generated for different stages of the packet processor 250.

Figure 5:
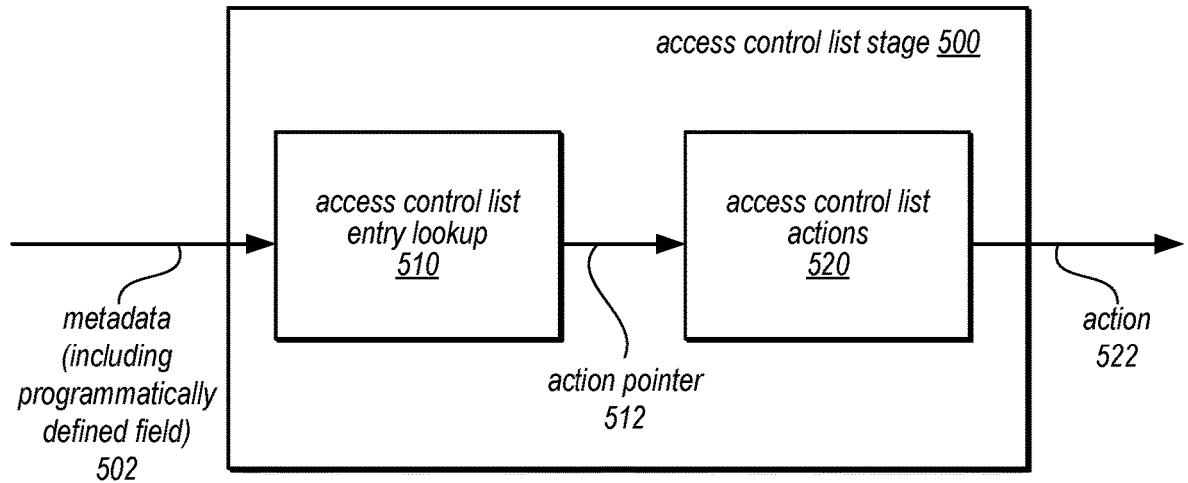
FIG. 5 is a logical block diagram illustrating an access control list stage in a packet processor that processes a programmatically defined field to determine a forwarding decision for a network packet, according to some embodiments.

As noted above with regard to FIG. 1, different processing stages may utilize a programmatically defined field to make forwarding decisions for a network packet. Different stages may utilize different (or the same) portion(s) of the same programmatically defined field. FIG. 5 is a logical block diagram illustrating an access control list stage in a packet processor that processes a programmatically defined field to determine a forwarding decision for a network packet, according to some embodiments. Access control list stage 500 may manage and apply packet filtering and/or forwarding rules for network packets received at a packet processor. Packet filtering and/or forwarding rules may be implemented to provide various different actions with respect to network security, quality of service and policy based routing.

Access control list stage 500 may obtain metadata 502 which includes a programmatically defined field for a network packet. This metadata may be used to identify different access control list entries, at access control list entry lookup 510, which in turn point to a respective action to perform for the network packet. Access control list entry lookup 510 may take a metadata field, like a programmatically defined field, and determine whether the value of the field matches any of the entries. For example, access control list entry lookup 510 may be implemented using a content associative memory (CAM) component such as a ternary CAM (TCAM) to identify a matching entry for a programmatically defined field. If a matching entry is found, then a pointer 512 located in the matching entry points to a particular action stored in access control list actions 520 to be performed with respect to the network packet.

Various actions in access control list actions may include, but are not limited to, dropping a packet, forwarding the packet to a controller/host CPU, setting the host/CPU forwarding class, setting the scheduler priority (to prioritize packets), enabling control plane or data plane policing and setting the policer ID, mirroring the packet, forcing the network packet into a particular weighted cost multi-path group, forcing a specific destination address, forcing a tunnel, and/or forcing a link aggregation group. In some embodiments, multiple entry lookups may be performed to identify multiple matching entries (where one or both lookups utilize the programmatically defined field to find a matching entry).

In some embodiments, access control list stage 500, and/or another stage that utilizes a programmatically defined field may be configured to extract or obtain a portion of the programmatically defined field for processing. Consider a scenario where access control list stage 500 is configured to extract one or more portions of the programmatically defined field for comparison at access control list entry lookup (instead of the entire field). In some embodiments, stages that utilize the programmatically defined field may be configured to extract portions of the programmatically defined field at the same granularity, data alignment or size as programmable field extractor 460 (e.g., extract nibbles or individual bits of data, rather than an entire byte of data).

Figure 6:
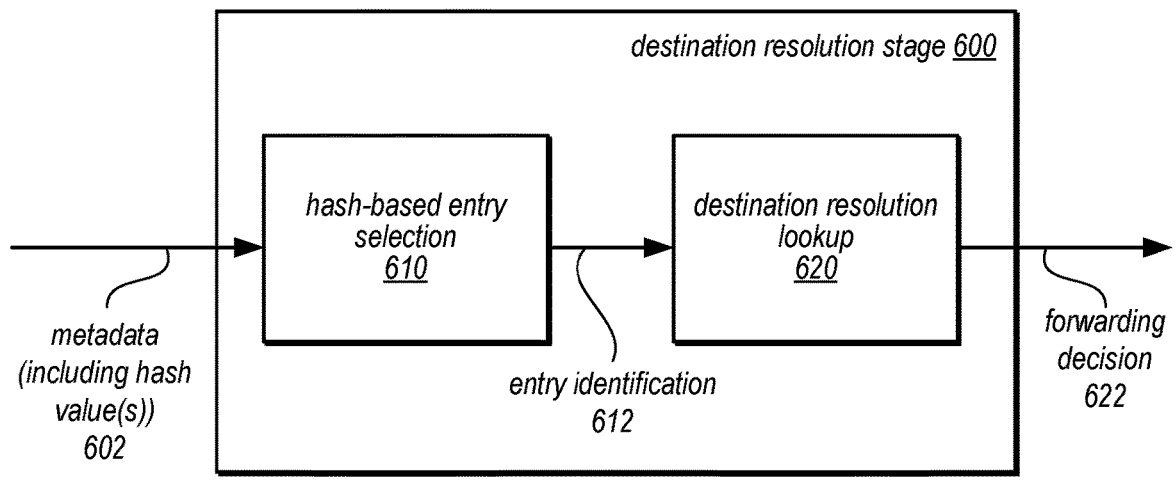
FIG. 6 is a logical block diagram illustrating a destination resolution stage in a packet processor that utilizes hash value generated by a programmatically defined field to determine a forwarding decision for a network packet, according to some embodiments.

In addition to directly utilizing a programmatically defined field for processing a network packet, the programmatically defined field may be utilized to generate a hash value, such as discussed above with regard to FIG. 4, in order to perform hash based selection of different forwarding decisions. FIG. 6 is a logical block diagram illustrating a destination resolution stage in a packet processor that utilizes hash value generated by a programmatically defined field to determine a forwarding decision for a network packet, according to some embodiments. Destination resolution stage 600 may perform various actions to determine a forwarding decision and/or select a forwarding route for a network packet. For example, destination resolution stage 600 may be a tunnel initiation stage (which may lookup tunnel initiation data to start or initiate tunneling for a network packet), a weighted multipath stage (which may distribute network traffic amongst multiple valid paths in a network stage according to different weights) or a link aggregation stage (which may enable sharing of bandwidth across multiple ports).

Destination resolution stage 600 may implement a hash-based entry selection 610 to determine an entry to lookup in order to make a forwarding decision 622 based on a destination resolution lookup 620 (e.g., which tunneling protocol to initiate) at the identified entry. Hash-based entry selection 610 may utilize a hash value (which may be specifically generated for destination resolution stage 600, such as a tunnel hash value, and may be generated, at least in part, from a programmatically defined field) to determine which entry to lookup at destination resolution 620. For example, hash-based entry selection 610 may be a table composed of different groups, where each group includes different elements. Hash ranges may be assigned to the different elements of a group. The assignment of hash ranges to different elements for a group may be programmed or reprogrammed by a controller or other component that may access memory maintaining hash-based entry selection 610. For example larger numbers of network packets may be directed to an entry in destination resolution lookup 620 by assigning a greater hash value range to a particular member that maps to the particular pointer. In this way, traffic may be distributed across elements in a group according to assigned hash ranges to the different elements.

Hash ranges may be equally assigned, providing an equal cost scheme or be differently sized, providing a weighted cost distribution scheme, in some embodiments. Continuing with the tunnel example, different amounts of network traffic may be allocated to different tunnels by directing traffic to different elements that point to tunnel pointers (e.g., in destination resolution lookup 620) which describe different tunnels (e.g., 20% traffic directed to a particular tunnel may be implemented by assigning 20% of the total hash space to a first element, 40% traffic may be directed to a second pointer mapped to a second element by setting a hash range equivalent to 40% of the hash space, 25% of traffic may be directed to a third pointer mapped to a third element equivalent to 25% of the hash space, and 15% of traffic directed to a fourth pointer mapped to a fourth element which may be 15% of the hash space).

The examples of generating programmatically defined fields for network packets as discussed above with regard to FIGS. 2-6 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may access, rely upon, or implement the generation of programmatically defined fields. In addition to examples given above, the techniques discussed below with regard to FIGS. 7-8 may be also implemented using the various components discussed above as well as different types of systems or devices that perform packet processing.

Figure 7:
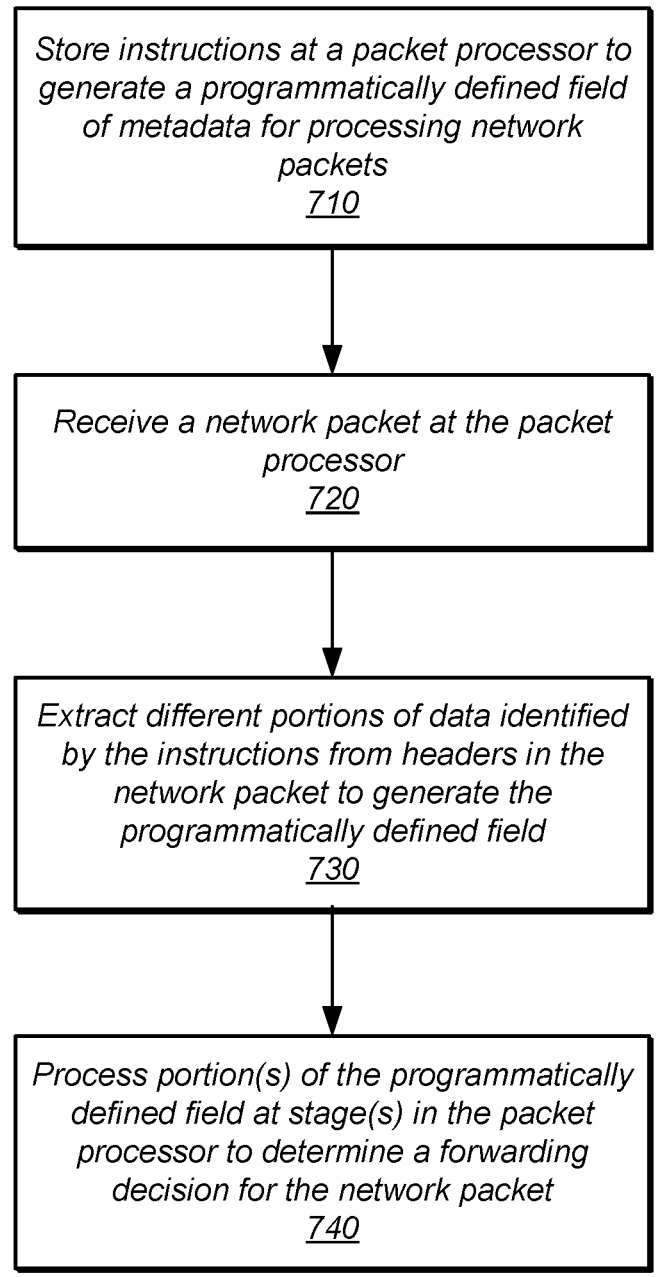
FIG. 7 is a high-level flowchart illustrating various methods and techniques to generate a programmatically defined field of metadata for network packets, according to some embodiments.

FIG. 7 is a high-level flowchart illustrating various methods and techniques to generate a programmatically defined field of metadata for network packets, according to some embodiments. As indicated at 710, instructions to generate a programmatically defined field of metadata for processing network packets may be stored at a packet processor, in various embodiments. Instructions may describe which headers include data to be extracted, validations or checks to be performed, such as checks to identify if the data is from the identified header, checks to identify if the previous header and current header information match, and/or a check to determine the packet type matches an indicated packet type for the data, the location of the portion of data within the header, the location of the portion of the data within the programmatically defined field (e.g., the particular byte in which the extracted nibble is stored) and whether any further data manipulations, such as a mask, are to be applied to the extracted portion of the data. Instructions may be stored in a register bundle array (RBA) or other component that controls the operation of a packet processor to extract particular portions of packet header data into a programmatically defined field. Each instruction may correspond to a different portion of data to be extracted, which may be equally-sized (e.g., each instruction specifies 1 bit to extract or 1 nibble to extract). To extract a larger portion of data, instructions may be specified to extract contiguous portions that encompass the larger portion of data (e.g., to capture a byte of data, 2 instructions corresponding to 2 contiguous nibbles that include the byte of data may be specified). Instructions may identify any header in a network packet and may specify one or multiple different headers from which data for a single programmatically defined field may be extracted. In some embodiments, instructions may be stored up to a size limit for a programmatically defined field (e.g., 5 bytes worth of data in a programmatically defined field may allow for 10 instructions specifying 10 nibbles of data to extract).

As indicated at 720, a network packet may be received at the packet processor. Network packets may be a discrete portion of the stream of data transmitted over various types of network connections, such as twisted pair connections, coaxial connections, or fiber optic connections, or other wired or wireless connections formatted according to various transmission protocols to a destination address. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4.

As indicated at 730, a programmatically defined field for the network packet may be generated by extracting different portions of data identified by the stored instructions from headers in the network packet. For example, the packet processor may identify a header for data as it is received at the packet processor, and provide an indication of the header to field extractor or other component which may generate the programmatically defined field, as discussed below with regard to FIG. 8. The packet processor may process packet data to parse the packet headers and extract packet metadata including the programmatically defined field in pipeline fashion as discussed above with regard to FIG. 4, or may buffer or iteratively circulate packet header data to parse the packet headers and extract packet metadata including the programmatically defined field, in other embodiments.

Once generated, a programmatically defined field may be included with other packet metadata provided to an ingress processing pipeline for a packet processor. Various forwarding decisions may be made utilizing the programmatically defined field, such as ingress access control stage 500 in FIG. 5 or a destination resolution stage in FIG. 6. Such stages, and other stages, may process portion(s) (or all of) the programmatically defined field in order to determine a forwarding decision for the network packet, as indicated at 740. For instance, various lookup operations may be performed based on the value the portion(s) of the programmatically defined field, or based on a value derived from the portion(s) of the programmatically defined field, such as the hash values discussed above.

In some embodiments, packet header data may be processed in streaming or pipelined fashion (such as discussed above with regard to FIG. 4). To extract data from multiple different headers of a network packet, different techniques may be implemented to identify and extract the data at an extraction component for a packet processor. FIG. 8 is a high-level flowchart illustrating various methods and techniques to extract portions of data from headers in a network packet to include in a programmatically defined field, according to some embodiments. As indicated at 810, data of a network packet and a header indication may be received at a field extractor (e.g., programmable field extractor 460) from a header separator (e.g., header separator 410. Based on the header indication, a determination may be made whether one or more portions of the indicated header are to be included in a programmatically defined field, as indicated at 820. For instance, as noted above, stored instructions may indicate those headers of a packet from which the programmatically defined field is generated. The instructions may be accessed and searched to see if the current header is identified in the instructions for extraction. Other checks or validations may also be performed (e.g., to insure that payload data of the packet is not used to generate the programmatically defined field). For instance, in some embodiments, a check may be made to determine whether the data being evaluated is from the correct stage in the processor pipeline and whether a field in the data being evaluated indicating the type of header matches the indicated header type for the data received from the header separator.

If portions in the data are to be included in the programmatically defined field, then as indicated at 830, the identified portions may be extracted and output according to the stored instructions (e.g., applying various masks or other data manipulations to extract the identified data and output the identified portions in a particular location, such as particular byte, within the programmatically defined field). A determination may be made as to whether the programmatically defined field is complete, as indicated at 840. For instance, an indication of header data for a new packet may be received such that no further header data for the current packet is forthcoming may indicate that the programmatically defined field is complete, a predetermined size or limit for the programmatically defined field may be reached, or all stored instructions for the programmatically defined field may have been executed. Once complete, the programmatically defined field may be provided as part of the metadata for processing network packet (e.g., transmit the field via metadata bus for the programmatically defined field). If, as indicated by the negative exit from 820, the data does not include portions of data to be extracted and the programmatically defined field is no completed, as indicated by the negative exit from 840, then new data may be received and evaluated for inclusion in the programmatically defined field.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations.

Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A packet processor, comprising:
a parser that generates programmatically defined fields of metadata for processing network packets received at the packet processor, wherein the parser comprises a header separator and a plurality of field extractors;
the header separator configured to:
identify different headers of a first network packet within a stream of data comprising a plurality of network packets as the stream of data is received, wherein the identified different headers correspond to a plurality of different layers of the first network packet;
provide a plurality of indications of the different headers of the first network packet within the stream of data to the plurality of field extractors responsive to completion of the identification of the different headers; and
the plurality of field extractors configured to:
extract, subsequent to the header separator providing the plurality of indications, different portions of the first network packet within the stream of data in parallel, according to instructions stored at the packet processor, that correspond to the different headers indicated by the header separator to generate different portions of the programmatically defined field of metadata for the first network packet from the different headers;
wherein the header separator is further configured to identify different headers of a second network packet while the plurality of field extractors generate the programmatically defined field of metadata for the first network packet;
a first processing stage configured to determine a forwarding decision for the first network packet according to a first subset of the programmatically defined field, wherein the first subset comprises some of the generated different portions corresponding to at least two of the plurality of different layers of the first network packet; and
a second processing stage configured to determine another forwarding decision for the first network packet according to a second subset of the programmatically defined field, wherein the second subset is different from the first subset.

2. The packet processor of claim 1, wherein the first processing stage is an access control list stage that performs a lookup operation with respect to the programmatically defined field to identify a corresponding action to perform at the packet processor with respect to the first network packet.

3. The packet processor of claim 1, wherein the second processing stage comprises:
a hash engine, configured to generate a hash value for a destination resolution stage at the packet processor based on the programmatically defined field; and
the destination resolution stage, configured to identify a forwarding decision for the first network packet in an entry in a lookup table selected according to the hash value.

4. A method, comprising:
receiving a first network packet at a packet processor;
generating, by the packet processor, a programmatically defined field of metadata for the first network packet, the generating comprising:
identifying, by a header separator, different headers within a stream of data for the first network packet as the stream of data is received;
providing, by the header separator, a plurality of indications of the different headers within the stream of data to a plurality of field extractors responsive to completion of the identification of the different headers; and
extracting, subsequent to the providing of the plurality of indications and in parallel by the plurality of field extractors according to instructions stored at the packet processor, different portions of the stream that correspond to the different headers to generate different portions of the programmatically defined field of metadata for the first network packet;
wherein the header separator identifies different headers of a second network packet within the stream of data as the stream of data is received while the plurality of field extractors generate the programmatically defined field of metadata for the first network packet;
determining, by the packet processor, a forwarding decision for the first network packet according to a first subset of the programmatically defined field at a stage in the packet processor, wherein the first subset comprises generated different portions corresponding to a plurality of different layers of the first network packet; and
determining, by the packet processor, another forwarding decision for the first network packet according to a second subset of the programmatically defined field at another stage in the packet processor, wherein the second subset is different from the first subset.

5. The method of claim 4, further comprising storing, by a controller for the packet processor, the instructions at the packet processor.

6. The method of claim 4, wherein determining the forwarding decision for the first network packet according to the first subset of the programmatically defined field at the stage in the packet processor comprises:
generating a hash value based on the first subset of the programmatically defined field; and
determining the forwarding decision for the first network packet at the stage in an entry in a lookup table selected according to the hash value for the stage.

7. The method of claim 6, wherein processing the second subset of the programmatically defined field at the other stage in the packet processor comprises:
generating another hash value based on the second subset of the programmatically defined field; and
determining another forwarding decision for the first network packet at the other stage in an entry in a lookup table selected according to the other hash value for the other stage.

8. The method of claim 4, wherein an extraction granularity for the programmatically defined field is different than for other metadata generated for the first network packet by the packet processor.

9. The method of claim 8, wherein determining the forwarding decision for the first network packet according to the first subset of the programmatically defined field at the stage in the packet processor is performed according to a same granularity as the extraction granularity.

10. The method of claim 4, wherein generating the programmatically defined field of metadata for the first network packet comprises validating header types in the data for the different headers of the first network packet prior to extracting the portions of the data.

11. The method of claim 4, further comprising:
storing, at the packet processor, other instructions to generate another programmatically defined field of metadata, wherein the other instructions identify a portion of data in one header to include in the other programmatically defined field;
receiving another network packet at the packet processor; and
extracting, by the packet processor, the portion of data identified by the instructions from the one header in the other network packet to generate the other programmatically defined field for the other network packet.

12. A system, comprising:
a device configured to perform packet processing, the device comprising;
a network interface configured to transmit and receive packets via a network connection to the device;
a packet processing pipeline, configured to:
receive a first network packet via the network interface;
identify, by a header separator, different headers within the first network packet;
provide, by the header separator, a plurality of indications of the different headers to a plurality of field extractors responsive to completion of the identification of the different headers;
extract, subsequent to providing the plurality of indications and in parallel by the plurality of field extractors, portions of data from different ones of the identified headers according to stored instructions to generate a programmatically defined field of metadata for processing the first network packet, wherein the instructions indicate the portions of data in the different headers to include in the programmatically defined field;
determine a forwarding decision for the first network packet at a stage in the packet processing pipeline based on a first subset of the programmatically defined field, wherein the first subset comprises some of the generated different portions corresponding to a plurality of different layers of the first network packet; and
process a second subset of the programmatically defined field at another stage in a packet processor, wherein the second subset is different from the first subset;
wherein the header separator identifies different headers of a second network packet within a stream of data as the stream of data is received while the plurality of field extractors generate the programmatically defined field of metadata for the first network packet.

13. The system of claim 12, wherein to determine the forwarding decision at the stage, the packet processing pipeline is configured to:
generate a hash value based on the first subset of the programmatically defined field according to other stored instructions for the generation of the hash value; and
determine the forwarding decision for the first network packet at the stage in an entry in a lookup table selected according to the hash value for the stage.

14. The system of claim 12, wherein the other stage is an access control list stage that performs a lookup operation with respect to the programmatically defined field to identify an action to perform with respect to the first network packet.

15. The system of claim 12, wherein an extraction granularity for the programmatically defined field is less than a byte.

16. The system of claim 12, further comprising:
a general processor;
a memory, comprising program instructions that when executed by the general processor cause the general processor to implement a controller for the packet processing pipeline; and
the controller configured to store the instructions at the device to generate the programmatically defined field of metadata.

17. The system of claim 12, wherein the device is an application specific integrated circuit (ASIC), a system-on-chip (SoC), or a field-programmable gate array (FPGA).

* * * * *